L. P. THESTRUP.
SAFETY HOISTING HOOK.
APPLICATION FILED SEPT. 17, 1917.
1,285,466.
Patented Nov. 19, 1918.
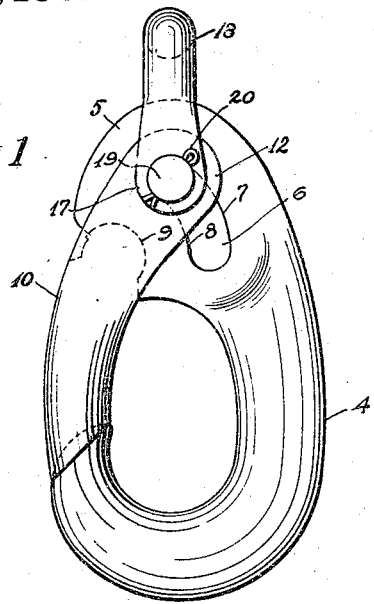
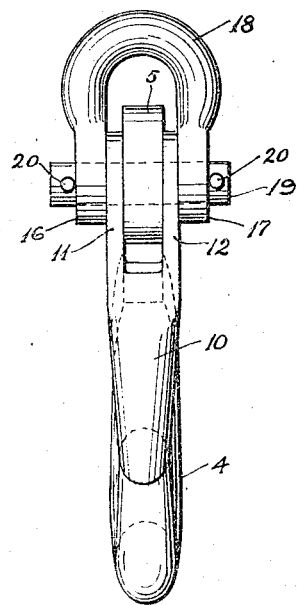
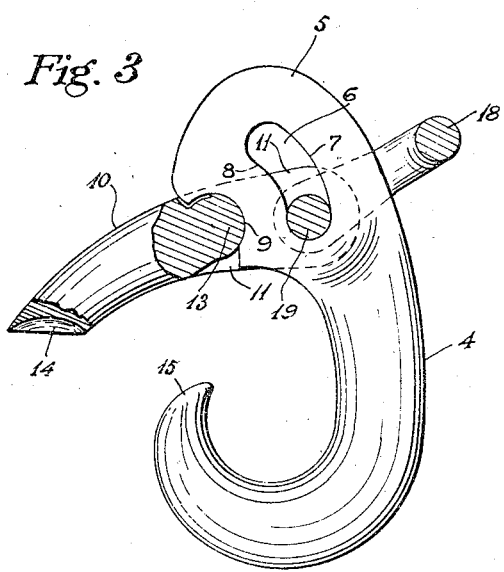
INVENTOR
Lewis P. Thestrup
BY
ATTORNEY

UNITED STATES PATENT OFFICE.

LEWIS P. THESTRUP, OF SEATTLE, WASHINGTON.

SAFETY HOISTING-HOOK.

1,285,466.   Specification of Letters Patent.   Patented Nov. 19, 1918.

Application filed September 17, 1917. Serial No. 191,380.

*To all whom it may concern:*

Be it known that I, LEWIS P. THESTRUP, a citizen of the United States, residing at Seattle, in the county of King and State of Washington, have invented a certain new and useful Improvement in Safety Hoisting-Hooks, of which the following is a specification.

My invention relates to improvements in safety hoisting hooks, and the object of my invention is to provide a hoisting hook which shall be adapted to be fastened to the free end of the hoisting chain or cable of a derrick, a winch or a crane and which shall be so constructed that when it is operatively attached to an object to be hoisted, and thereupon is subjected to the strain of hoisting said object, then its parts shall be so relatively disposed automatically that it cannot be disconnected from said object so long as such strain continues.

I accomplish this object by devices illustrated in the accompanying drawings, wherein—

Figure 1 is a view in side elevation showing a hoisting hook embodying my invention with its parts relatively disposed as they would be when suspending a load;

Fig. 2 is a view of the same in front elevation; and

Fig. 3 is a view of the same in side elevation, showing its parts relatively disposed as they would be to attach it to or detach it from an object to be hoisted.

Referring to the drawings, throughout which like reference numerals indicate like parts, 4 is a hook the upper end portion 5 of whose shank is flattened and broadened to have parallel opposite side surfaces.

Extending from side to side through the central part of said upper end portion 5 is a curved slot 6 the opposite curved walls of which slot 6 form concentric arcs of circles 7 and 8 that are also concentric with an arc of another but smaller circle that is described by the curved wall of a recess 9 that is formed in the inner edge portion of said upper end portion 5, which recess 9 is shown by a circular broken line in Fig. 1 and by a circular full line in Fig. 3.

A curved locking finger or toggle lever 10 is formed to have one of its end portions bifurcated to provide spaced side members 11 and 12, the surface of the metal at the bottom of the space between said members 11 and 12 being curved to describe the larger portion of a circle, such curved surface serving to form a fulcrum 13 for said lever 10 as shown more clearly in Fig. 3.

The upper end portion 5 of the hook 4 is disposed within the space between the side members 11 and 12 of the lever 10 so that the fulcrum 13 thereof operatively fits within the curved recess 9 which serves as a bearing therefor, whereby said lever 10 may be swingingly moved on said fulcrum 13 to cause its outer concaved end 14 to engage and disengage the convexed end 15 of the hook 4 as indicated in Fig. 3.

The perforated end portions 16 and 17 of a clevis 18 are disposed with their inner side surfaces in free engagement with the outer side surfaces of the side members 11 and 12, respectively; and a clevis pin 19 is disposed to extend through the end portions 16 and 17, through holes formed in the side members 11 and 12, and through the curved slot 6 of the end portion 5 of the hook 4, said clevis pin 19 being confined in its lengthwise position by cotter pins 20.

The clevis pin 19, by its position in the slot 6, maintains the fulcrum 13 in its operative position.

The clevis 18 is adapted to be connected to a hoisting chain or cable in a well known manner not shown.

In the operation of a safety hoisting hook embodying my invention, the hoisting cable, to which the hook is attached, is lowered and slackened to permit the clevis 18 to be free from stain, whereupon the clevis pin 19 may move in the slot 6 from the upper end to the lower end thereof to carry with it the side members 11 and 12 of the lever 10 thus to swing said lever 10 on its fulcrum 13 to its open position shown in Fig. 3, thus to permit the sling or chain of the object to be hoisted to be disposed in the hook 4, and thereupon the hoisting cable is actuated to impart a strain on the clevis 18 to hoist the object with the result that the clevis pin 19 will be raised to the upper end of the slot 6 thus to force the lever 10 to engage its concaved end 14 with the convexed end 15 of the hook 4 thereby to prevent the sling or chain of the object to be hoisted from getting accidentally displaced from the hook 4.

Manifestly, when the hoisting cable is again lowered and its load is deposited in its required position the hoisting cable will slacken automatically to permit the clevis pin 19 to fall to the lower end of the slot 6 to swing the lever 10 to its open position shown in Fig. 3.

Obviously changes may be made in the forms, dimensions and arrangement of parts of my invention without departing from the spirit thereof.

What I claim is:

1. A safety hook including a hook member having a shank provided with a curved slot extending therethrough at one end, a locking finger fulcrumed on said shank concentric to said slot and having one of its ends formed to engage the point of said hook member, the other end portion of said locking finger being extended from the fulcrum to a point overlying said curved slot and a clevis having a transverse pin extending through said other end portion of said locking finger and through said curved slot in said shank whereby a movement of said clevis away from the point of said hook member will cause said locking finger to move into engagement with the point of said hook member and a downward movement of said clevis will cause said locking finger to disengage from said point of said hook member.

2. A safety hook including a hook member having a shank provided with a curved slot therethrough at one end and a recess in one edge of said end, the wall of said recess being curved and concentric to said slot, a locking finger fulcrumed against said shank in said recess and having one end formed to engage the point of said hook member, the other end portion of said locking finger being extended from the fulcrum to a point overlying said curved slot, and a clevis having a transverse pin extending through said other end portion of said locking finger and through said curved slot in said shank.

3. A safety hook including a hook member having a shank provided with a curved slot therefrom at one end and a recess in one edge of said end, the wall of said recess being curved and concentric to said slot, a locking finger fulcrumed against said shank in said recess and having one end formed to engage the point of said hook member, the other end portion of said locking finger being bifurcated to provide a pair of side members flatly engaging the opposite sides of said shank and extending from the fulcrum to a point overlying said curved slot, and a member provided with means for attachment to a rope having a pin extending through said other end portion of said locking finger and through said curved slot in said shank.

In witness whereof I hereunto subscribe my name this 10th day of September, A. D. 1917.

LEWIS P. THESTRUP.

Copies of this patent may be obtained for five cents each, by addressing the "Commissioner of Patents, Washington, D. C."